United States Patent
Champagne et al.

(10) Patent No.: US 7,941,631 B2
(45) Date of Patent: May 10, 2011

(54) PROVIDING METADATA IN A TRANSLATION LOOKASIDE BUFFER (TLB)

(75) Inventors: David Champagne, Princeton, NJ (US); Abhishek Tiwari, Urbana, IL (US); Wei Wu, Hillsboro, OR (US); Christopher J. Hughes, San Jose, CA (US); Sanjeev Kumar, San Jose, CA (US); Shih-Lien Lu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 12/005,892

(22) Filed: Dec. 28, 2007

(65) Prior Publication Data

US 2009/0172243 A1 Jul. 2, 2009

(51) Int. Cl.
*G06F 12/10* (2006.01)

(52) U.S. Cl. ............ 711/207; 711/3; 711/108; 711/144; 711/202; 711/206

(58) Field of Classification Search .............. 711/3, 108, 711/144, 202–203, 206–207, E12.002
See application file for complete search history.

(56) References Cited

U.S. PATENT DOCUMENTS 7,330,959 B1 * 2/2008 Anvin ........................... 711/206

OTHER PUBLICATIONS

Andrew W. Appel, et al., "Virtual Memory Primitives For User Programs," 1991, pp. 96-107.
Emmett Witchel, et al., "Mondrian Memory Protection," 2002, pp. 1-13.
Rithin Shett, et al., "HeapMon: A Low Overhead, Automatic, and Programmable Memory Bug Detector," Oct. 2003, pp. 1-10.
Sanjeev Kumar, et al., "Hybrid Transactional Memory," Mar. 2006, pp. 1-12.
Pin Zhou, et al., "iWatcher: Efficient Architectural Support For Software Debugging," 2004, pp. 1-12.

* cited by examiner

*Primary Examiner* — Jasmine Song
(74) *Attorney, Agent, or Firm* — Trop, Pruner & Hu, P.C.

(57) ABSTRACT

In one embodiment, the present invention includes a translation lookaside buffer (TLB) to store entries each having a translation portion to store a virtual address (VA)-to-physical address (PA) translation and a second portion to store bits for a memory page associated with the VA-to-PA translation, where the bits indicate attributes of information in the memory page. Other embodiments are described and claimed.

16 Claims, 4 Drawing Sheets

PROVIDING METADATA IN A TRANSLATION LOOKASIDE BUFFER (TLB)

BACKGROUND

Several techniques in computer architecture and security require storing some state information, ranging from a few bits to half a dozen bytes, for memory regions, usually the size of cache lines. These state bits are commonly stored physically with the cache lines and occasionally in separate ad hoc structures like a speculative cache. Such schemes suffer two significant drawbacks. First, storing state bits in the cache incurs a sizeable hardware overhead, and makes the design inflexible. Second, the amount of memory that can be tracked by these schemes is bounded by the cache size. For example, in certain debugging models that store bits in cache lines to indicate if they contain allocated or initialized data, a cache line eviction forces the scheme to make conservative predictions of bugs and hence incurs false positives or false negative. Similarly, for hardware transactional memory, if a speculative cache line has to be evicted, the transaction must be aborted.

In modern processors, translation lookaside buffers (TLBs) store address translations from a virtual address (VA) to a physical address (PA). These address translations are generated by the operating system (OS) and stored in memory within page table data structures, which are used to populate the TLB. Generally, such translations are the only information stored in a TLB.

DETAILED DESCRIPTION

In various embodiments, TLB entries may include information in addition to address translations. Such a TLB is referred to herein as an "extended TLB," or "ETLB." The extended bits, or E-bits, may store extra state information (metadata) for each page of memory. The granularity of the E-bits will match the desired functionality, and can be as fine-grained (e.g., bits per word) or coarse-grained (e.g., bits for the whole page) as desired for a given implementation. While the scope of the present invention is not limited in this regard, the bits may be associated with words, objects, or cache lines to implement a wide variety of functionality varying from security, transactional memory, detecting heap overflow, detecting illegal memory accesses, garbage collection, checkpointing, versioning, etc. Embodiments may thus provide a hardware structure to store additional information for memory regions, a hardware mechanism to enable user code to utilize this structure for a particular application or to utilize the bits in this structure as tags in a tagged architecture (e.g., for security purposes), and a hardware scheme to keep the ETLB coherent on multiple core machines.

In different embodiments, the E-bits may be stored in system memory (from which recently or frequently used bits can be copied into the ETLB). In many embodiments, the E-bits may have a dedicated structure in memory, referred to herein as an Extended Page Table (EPT) (the page table for the extended bits), which can be stored in user space (i.e., is not part of the normal OS page tables) or in kernel space if the particular usage of the E-bits so dictates (e.g., security). In either case, the E-bits for a page may be kept in a completely different location than that page's page table entry. The EPT can use a structure similar to an extended memory paging structure, such as a four-level page table scheme. However, it is also possible to use a different structure since the E-bits might be specified only on a small portion of the address space (for instance, only on the heap when used to monitor the heap).

In one embodiment, the E-bits for a page are fetched into the ETLB upon a TLB miss for that page's address translation. The E-bits are kept coherent between the ETLB and data caches for all of the cores in the system. This allows updates to these bits by one core to be immediately visible to another core. In one embodiment, all E-bits related to a page may be stored in a contiguous region of physical memory (i.e., in the EPT), which allows fetching all of a page's E-bits into the ETLB with a few memory transactions.

Some implementations may have two primary usage models for E-bits, depending on whether the bits are user-visible or not. First, user-accessible E-bits may be provided to enable user access to this information in the ETLB. Another user model is for kernel-accessible E-bits, which may be primarily used for security, where the E-bits are also known as "tags."

Figure 1:
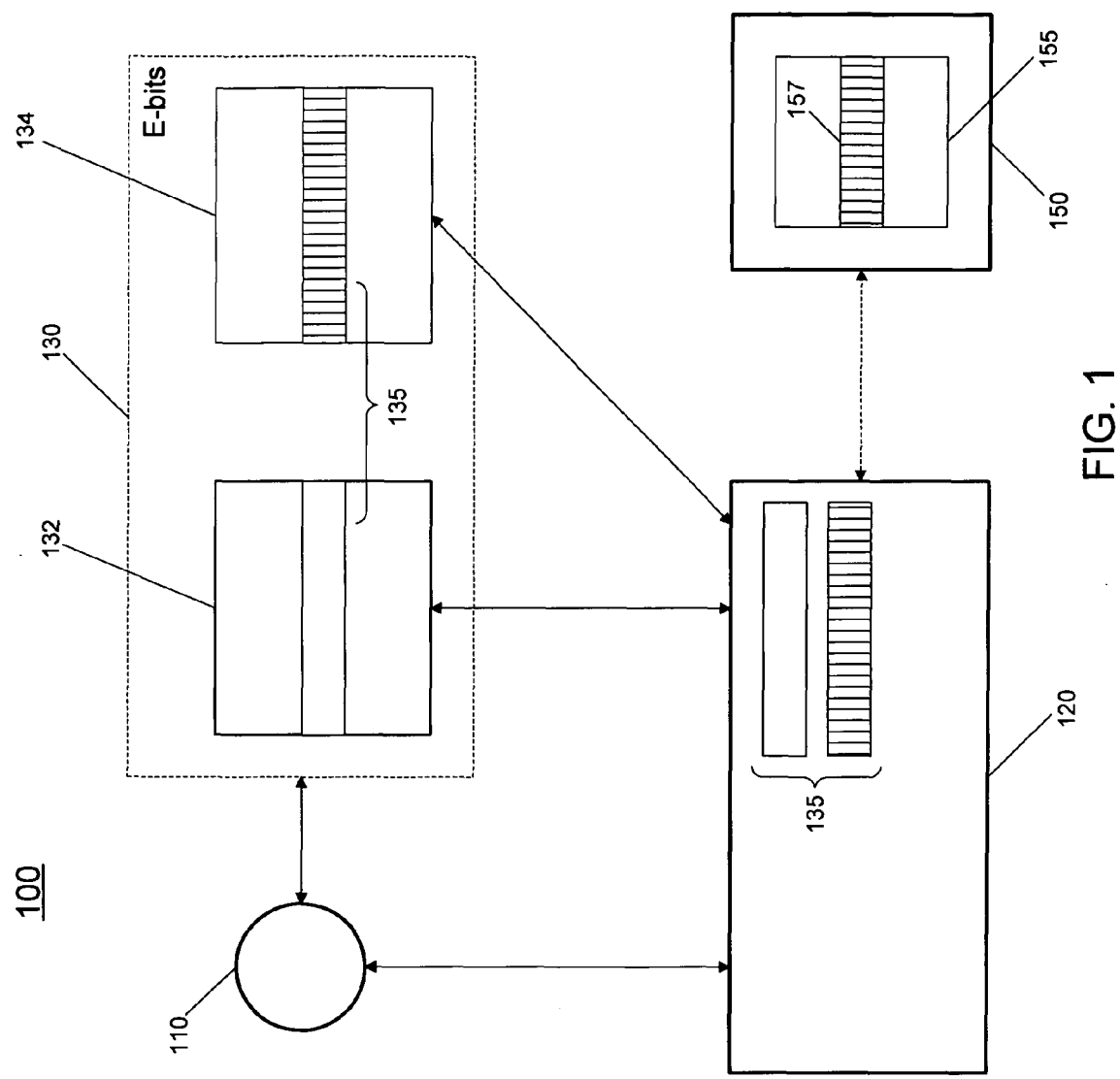
FIG. 1 is a block diagram of a portion of a system in accordance with one embodiment of the present invention.

Referring now to FIG. 1, shown is a block diagram of a portion of a system in accordance with one embodiment of the present invention. As shown in FIG. 1, system 100 may be a multiprocessor system including a first core 110, to which is coupled an ETLB 130 and a first level (i.e., a level 1 (L1)) cache 120. Additional levels of a memory hierarchy may also be coupled to cache 120, including a memory 150, which may be a main memory such as a dynamic random access memory (DRAM), although the scope of the present invention is not limited in this regard.

As shown in FIG. 1, each entry 135 of ETLB 130 includes a translation portion 132, which may be used to store VA-to-PA translations, as well as an E-bit portion 134. As shown in FIG. 1, multiple such E-bits may be present in various embodiments. Depending on their state and a given function associated with one or more of the bits, an exception may be indicated based on a given access being sought with regard to pages associated with such an E-bit. As further shown in FIG. 1, entry 135 may also be present in cache 120. While shown with only a single cache and core in the embodiment of FIG. 1 for ease of illustration, understand that system 100 may include multiple such cores and caches. In this way, E-bits associated with a given page can be stored in multiple caches and TLBs. To maintain coherency between the various caches and TLBs, mechanisms may be provided to ensure that the E-bits remain coherent, as will be described further below.

As further shown in FIG. 1, memory 150 may include an extended page table (EPT) 155, which may include multiple entries 157, each including associated E-bits for a given page. Note that EPT 155 may be stored in user space in memory, although in implementations for use with security models, the table may be instead stored in kernel space. Furthermore, note that EPT 155 may be in a completely different location than the corresponding page table (not shown in FIG. 1) to which it relates. Thus EPT 155 and the corresponding page table can be separated in address space. While shown with this particular implementation in the embodiment of FIG. 1, the scope of the present invention is not limited in this regard.

To illustrate the different aspects of the embodiments, consider the case where it is to be ensured that uninitialized heap data is not used. In this example, newly allocated heap data has to be marked as uninitialized (e.g., a first value for a corresponding E-bit). Once a heap region is initialized (e.g., a second value for a corresponding E-bit), it is legal to read it.

The E-bits allow keeping track of whether heap regions have been initialized. The E-bits can be coherent across different cores. In this example, this is needed because data is legally accessible by multiple threads once any thread has initialized the data. To make the E-bits coherent across cores, a given cache-coherence protocol can be leveraged by making the E-bits to be inclusive in the L1 cache. This means that if a core writes to the E-bits, the cache coherence protocol will cause the cache line that has those E-bits to be evicted from all other cores' private caches. Since the E-bits are inclusive, the E-bits will be evicted from the ETLB from all other cores, ensuring that the E-bits stay coherent. Note that a single cache line might contain the E-bits for multiple ETLB entries. Therefore, the ability to index into multiple TLB entries using a cache line tag may be provided. In one embodiment, this can be supported by using a content addressable memory (CAM) array that stores the cache line address for each TLB entry. When a cache line is evicted, all TLB entries that match this line in the CAM array are invalidated.

Analogously to how the regular TLB is backed up by a structure in memory (i.e., the page table), the E-bits are backed by the Extended Page Table (EPT). Unlike the page table, which is owned by the OS and inaccessible to the user-level application, the EPT is a user-level entity and is managed and maintained in user space. In principle, the EPT can use the same organization as a 4-level page table. In some embodiments, however, EPT might not need an entry for every page in the user program and can instead use other representations. For instance, in this example, the E-bits are needed only for the memory region occupied by the heap. For efficiency, 1 bit in each OS page table entry may be used to mark if that page has E-bits associated with it. This will ensure that there is no performance penalty for supporting embodiments when the E-bits are not being used.

To change the E-bits, the program writes to the appropriate location in the EPT. Since the E-bits are already kept coherent with memory, such an update will automatically evict the E-bits from all the ETLBs that had that entry. On a subsequent ETLB access, the E-bits will be read from the memory subsystem and the ETLB will get the updated values. Since an ETLB uses hardware to determine the memory address of the E-bits for a given virtual address (to support a hardware TLB walker), an instruction may be provided which returns the memory address of the extended page table entry for the input virtual address. The memory addresses for the extended page table are mapped directly to physical memory.

A user-level exception is generated when a triggering event occurs. In this example, an access to an uninitialized location in the heap (i.e., a bit of the E-bits is of a second state) will generate an exception. If it is a write access, the exception handler that is executed may mark the location to an initialized state and the write is allowed to commit after returning from the exception. If it is a read access, an error indicating an illegal access to an uninitialized location in memory is flagged by the exception handler.

Figure 2:
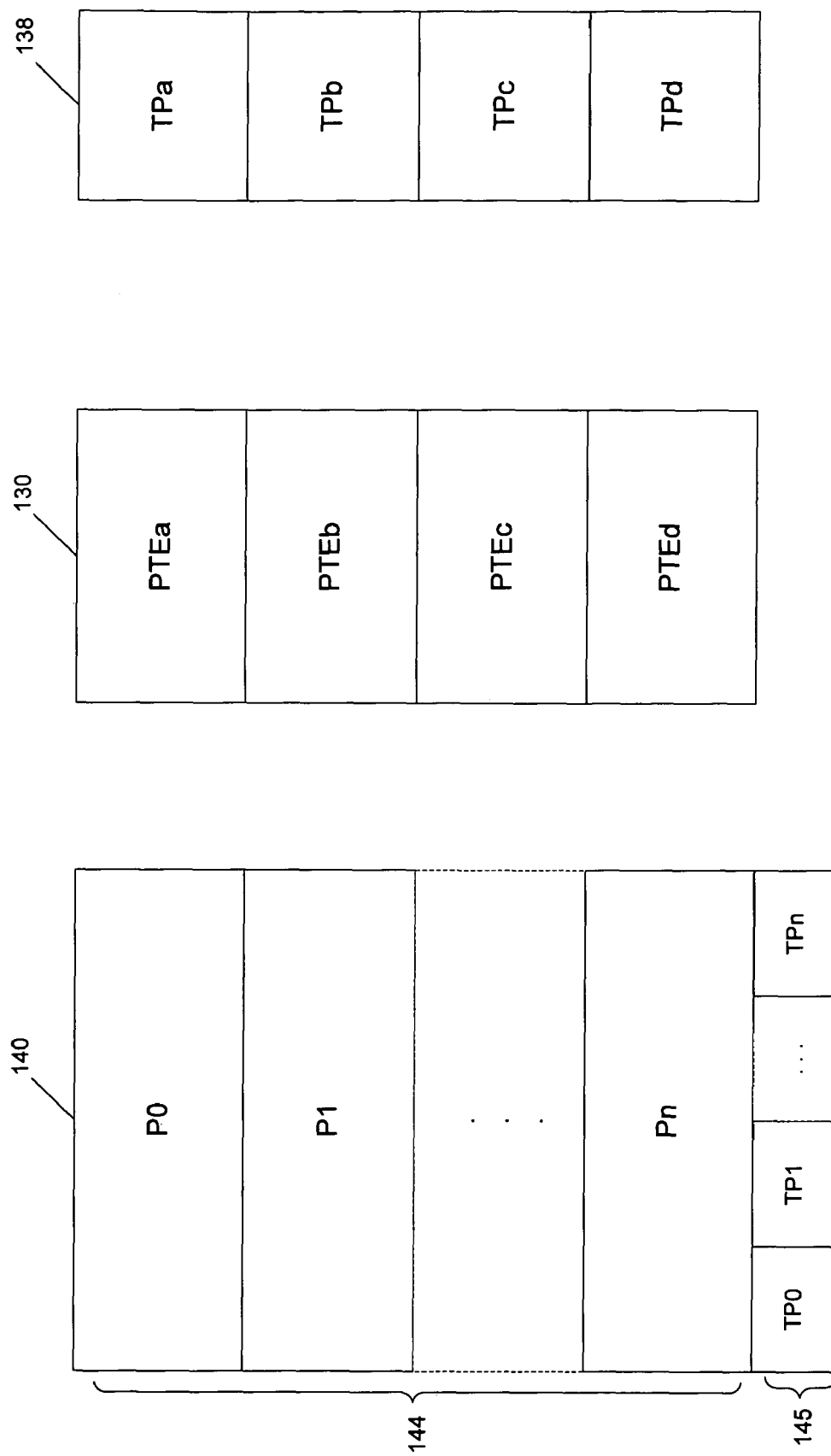
FIG. 2 is a block diagram of example locations of tag storage capabilities in accordance with an embodiment of the present invention.

Another usage model is for kernel-accessible E-bits. This embodiment may be primarily used for security, where the E-bits are also known as "tags". Referring now to FIG. 2, shown is a block diagram of example locations of tag storage capabilities in accordance with an embodiment of the present invention. As shown in FIG. 2, main memory 140 may include multiple page frames in a page frame storage area 144. More specifically, page frames $P_0$-$P_N$ may be present. Each of these page frames may have tags or extended state information associated therewith. Specifically, as shown in FIG. 2 main memory 140 may further include a tag storage area 145 (e.g., which may correspond to the extended page table 155 of FIG. 1) to store a plurality of tag structures $TP_0$-$TP_n$, each associated with one of the page frames. TLB 130 may store various page table entries, $PTE_{A-D}$, each of which may correspond to a page table entry for one of the page frames $P_X$ stored in page frame area 144. In the embodiment of FIG. 2, however a separate tag cache 138 may be provided to store the corresponding tags or state information for these page table entries. Specifically, tag cache 138 may include a plurality of entries $TP_A$-$TP_D$, each associated with a given $PTE_X$ stored in TLB 130.

As shown in FIG. 2, all tags are stored contiguously in a dedicated region of main memory (i.e., area 145). In addition, tag cache 138 stores a copy of the tags belonging to the pages which have their translations in the TLB. There can be two tag caches: one for the instruction TLB and another for the data TLB. For simplicity, FIG. 2 only depicts one TLB and one tag cache.

Figure 3:
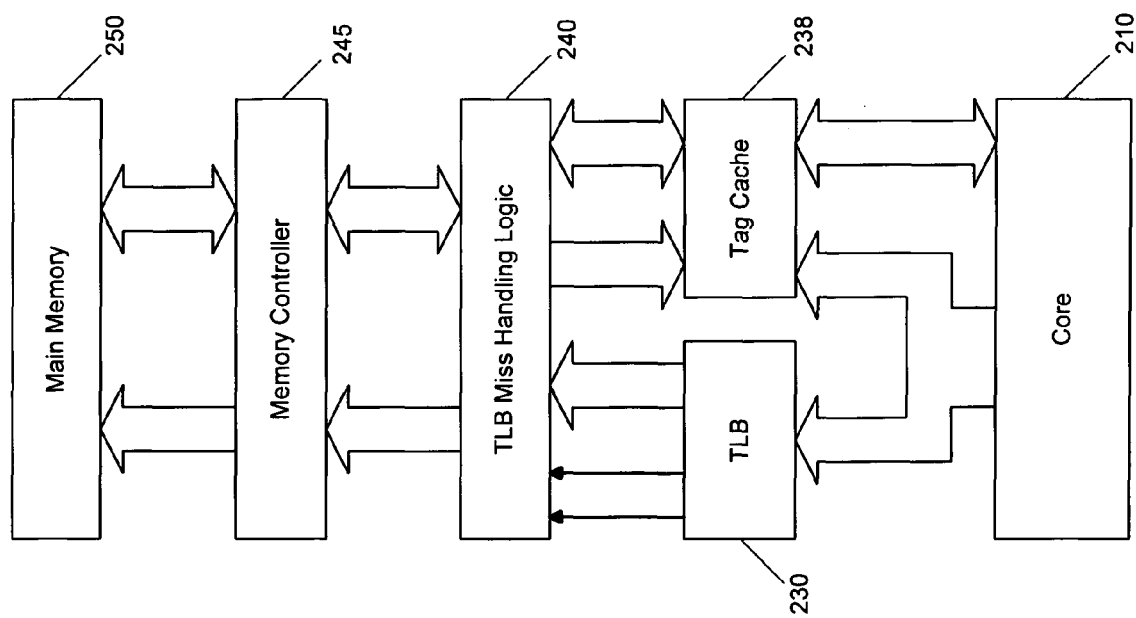
FIG. 3 is a block diagram of the interaction between various components in accordance with an embodiment of the present invention.

Referring now to FIG. 3, shown is a block diagram of an interaction between various components in accordance with an embodiment of the present invention. As shown in FIG. 3, to retrieve tag information various components may interact. Specifically, the core may request information present in a particular page of main memory 250. Accordingly, core 210 provides an address to both a TLB 230 (which includes translation information only) and a tag cache 238 (which includes the E-bits). If the corresponding PA-to-VA translation is not present in TLB 230, a TLB miss may be indicated and provided to TLB miss handling logic (TMHL) 240 which in turn may provide the requested address to a memory controller 245 which in turn is coupled to main memory 250 to thus enable loading of a page table entry into TLB 230. Similar mechanisms may be used if a requested address does not hit a tag cache entry in tag cache 238, as a request may be made through TMHL 240 and memory controller 245 to obtain the tag information from its dedicated storage in main memory 250 and provide it for storage in tag cache 238. Note that FIG. 3 depicts only the signals related to tag handling. Thus on a TLB miss, the TMHL 240 fetches not only the page table entry for the missing page, but also the tags for the data in that page. TMHL 240 writes these tags into the tag cache 230 by providing the appropriate index.

Upon a TLB flush, TMHL 240 reads the dirty tags from tag cache 238 and writes them back to memory 250. During execution of a tagged application, the address used by core 210 to index the TLB 230 is also used to index tag cache 238. On a memory read, this allows tag cache 238 to output the tag of interest on the extended memory read bus. On a memory write, the address sent by the core tells tag cache 238 where to write the tag it finds on the extended memory write bus.

Embodiments may provide lower hardware overhead. Further, tracking capacity is not constrained by the size of architectural structures. The E-bits are stored in memory and cached in the extended TLB; therefore any changes to them are preserved in the extended page table stored in memory. The persistent E-bits are stored in a separate place in memory from the data so that error correction coding (ECC) bits do not need to be used to hold E-bits instead of error correction codes (which would not work on systems with non-ECC RAM), and also so that the width of words in RAM does not need to be increased. Embodiments further provide a mechanism for keeping the TLB coherent through the cache coherence protocol with minimal changes and minimal performance impact on programs not using this mechanism.

Embodiments may be used in various applications, such as for transactional memory, detecting heap overflow, detecting illegal memory accesses, garbage collection, checkpointing, versioning etc., all of which may achieve large performance benefits from the ability to store state bits per cache line without being restricted by cache size. Also, with the current push for integration of security features into computer hardware, hardware-driven tagging may be a flexible countermeasure to many software vulnerabilities.

Embodiments thus can store additional information for words, cache lines, or pages without extending the width of memory, using the ECC bits for non-ECC purposes, or storing the information in caches but losing it when the line is evicted. In this way a dedicated structure tied to the TLB is provided to cache additional information for each word, cache line, or page.

Figure 4:
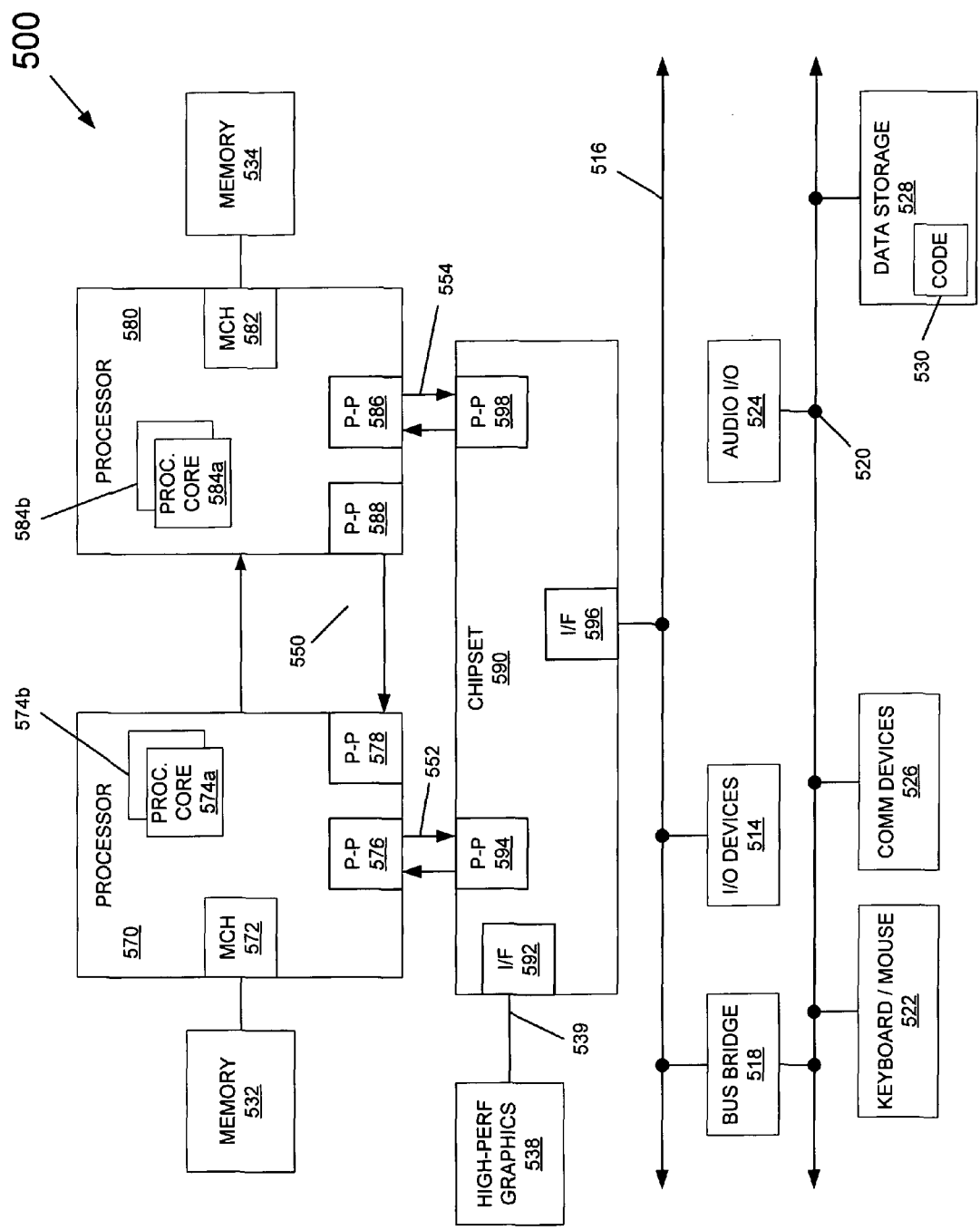
FIG. 4 is a block diagram of a system in accordance with an embodiment of the present invention.

Embodiments may be implemented in many different system types. Referring now to FIG. 4, shown is a block diagram of a system in accordance with an embodiment of the present invention. As shown in FIG. 4, multiprocessor system 500 is a point-to-point interconnect system, and includes a first processor 570 and a second processor 580 coupled via a point-to-point interconnect 550. As shown in FIG. 4, each of processors 570 and 580 may be multicore processors, including first and second processor cores (i.e., processor cores 574a and 574b and processor cores 584a and 584b). Each processor may include extended TLB hardware, software, and firmware in accordance with an embodiment of the present invention.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors, each of which may include extended page tables in accordance with one embodiment of the present invention. First processor 570 and second processor 580 may be coupled to a chipset 590 via P-P interconnects 552 and 554, respectively. As shown in FIG. 4, chipset 590 includes P-P interfaces 594 and 598.

Furthermore, chipset 590 includes an interface 592 to couple chipset 590 with a high performance graphics engine 538. In turn, chipset 590 may be coupled to a first bus 516 via an interface 596. As shown in FIG. 4, various I/O devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first processor core to execute instructions;
a first translation lookaside buffer (TLB) coupled to the first processor core, the first TLB to store a plurality of entries each having a translation portion to store a virtual address (VA)-to-physical address (PA) translation and a second portion to store a plurality of bits for a memory page associated with the VA-to-PA translation, the plurality of bits to indicate at least one attribute of information in the memory page, wherein the plurality of bits of the second portion for a plurality of memory pages are to be stored in a table stored in user level space of a memory and a first bit of the plurality of bits is of a first state to indicate that a corresponding memory page is an initialized heap region, and wherein a user-level exception is to be generated if a write access occurs to an uninitialized heap region and if so, a handler is to update the first bit to the first state.

2. The apparatus of claim 1, wherein the table is separated in address space from a page table that stores a page table entry for each of the plurality of memory pages, the page table stored in operating system (OS) level space.

3. The apparatus of claim 2, wherein each page table entry includes an enable bit having a first state to indicate that the corresponding page table entry has a plurality of bits associated therewith in the table, and a second state to indicate that the corresponding page table entry does not have bits in the table associated therewith.

4. The apparatus of claim 1, wherein the apparatus comprises a multi-core processor including a plurality of processor cores, each including a corresponding TLB and a cache, wherein the multi-core processor is to cause eviction of a first entry having a translation portion and second portion associated with a first entry in the table in the memory from the plurality of TLBs when a user-level program updates at least one bit in the first entry of the table.

5. The apparatus of claim 4, wherein the plurality of bits are coherent across the plurality of processor cores and when the plurality of bits for a first memory page are updated by the first processor core, the corresponding plurality of bits are to be evicted from the caches and TLBs of the other processor cores.

6. The apparatus of claim 5, further comprising a content addressable memory (CAM) array to store addresses for each entry in the first TLB, wherein the CAM array is to receive a tag and index into the plurality of the entries based on the tag.

7. A system comprising:
a processor including a first core to execute instructions, a first translation lookaside buffer (TLB) coupled to the first core, the first TLB to store a plurality of entries each having a translation portion to store a virtual address (VA)-to-physical address (PA) translation and a second portion to store a plurality of bits for a memory page associated with the VA-to-PA translation, the plurality of bits to indicate at least one attribute of information in the memory page, and a first cache coupled to the first TLB and the first core, wherein the first cache may store at least some of the second portion of at least some of the TLB entries;

a dynamic random access memory (DRAM) coupled to the processor, the DRAM to store a page table including page table entries for a plurality of memory pages in the DRAM, the page table located in kernel level space, and a second table including metadata for at least some of the pages in the DRAM;

a logic to receive an address that missed in the first TLB and to fetch a VA-to-PA translation associated with the address from the page table for storage in the first TLB and the metadata associated with the address from the second table for storage in the first cache, wherein the second table is located in the kernel level space and the processor comprises a multi-core processor including a plurality of cores, each including a corresponding TLB and a cache, wherein the multi-core processor is to cause eviction of a first entry having a translation portion and a second portion associated with a first entry in the second table from the plurality of TLBs when an update to at least one bit in the first entry occurs.

8. The system of claim 7, wherein the multi-core processor is to cause eviction of a first entry having a second portion from the first TLB when a cache line of the first cache including the second portion is evicted from the first cache.

9. The system of claim 7, wherein the plurality of bits are coherent across the plurality of cores and when the plurality of bits for a first memory page are updated by the first core, the corresponding plurality of bits are to be evicted from the caches of the other cores.

10. The system of claim 7, wherein a first bit of the plurality of bits is of a first state to indicate that a corresponding memory page is an initialized heap region, and wherein a user-level exception is to be generated if a write access occurs to an uninitialized heap region and if so, a handler is to update the first bit to the first state.

11. The system of claim 10, wherein each page table entry includes an enable bit having a first state to indicate that the corresponding page table entry has the metadata associated therewith in the second table, and a second state to indicate that the corresponding page table entry does not have metadata associated therewith.

12. A processor comprising:

a first core to execute instructions and associated with a first cache to store attribute information for a memory page, the attribute information to be maintained coherent with a table stored in a memory that includes the attribute information, the table accessible in a user-level space;

a second core to execute instructions and associated with a second cache to store attribute information for a memory page, the attribute information to be maintained coherent with the table stored in the memory, wherein the first core is to cause eviction of the attribute information stored in the second cache when an update to at least one bit of the attribute information in the first cache occurs.

13. The processor of claim 12, wherein the attribute information is associated with a transactional memory.

14. The processor of claim 12, wherein the attribute information is associated with checkpointing.

15. The processor of claim 12, wherein the attribute information is associated with detection of a heap overflow.

16. The processor of claim 12, wherein the memory further includes a page table that stores a page table entry for the memory page, the page table entry including an enable bit having a first state to indicate that the corresponding page table entry has attribute information associated therewith in the table, and a second state to indicate that the corresponding page table entry does not have attribute information in the table associated therewith.

* * * * *